United States Patent [19]

La Rue

[11] 3,992,802

[45] Nov. 23, 1976

[54] JAR LID MOUSE TRAP

[76] Inventor: Landon La Rue, Box 918, Mecca, Calif. 92254

[22] Filed: July 7, 1975

[21] Appl. No.: 593,665

[52] U.S. Cl. ............................................... 43/61
[51] Int. Cl.² ...................................... A01M 23/20
[58] Field of Search ................................... 43/61

[56] References Cited
UNITED STATES PATENTS

| | | | |
|---|---|---|---|
| 1,011,207 | 12/1911 | Kemp | 43/61 |
| 2,216,644 | 10/1940 | Heldman | 43/61 |

FOREIGN PATENTS OR APPLICATIONS

| | | | |
|---|---|---|---|
| 8,606 | 4/1901 | United Kingdom | 43/61 |

*Primary Examiner*—Warner H. Camp
*Attorney, Agent, or Firm*—Robert C. Comstock

[57] ABSTRACT

A mouse trap incorporated within a jar lid for trapping a mouse within a jar to which the lid is attached. The mouse trap includes a trap door which is mounted for vertical sliding movement across a mouse size opening in the lid. The trap door is manually moved to elevated open position and is held for release by swinging movement of a bait holder mounted on the inside of the lid. Such movement is caused by the mouse taking the bait, which is accessible only from within the jar. The door moves down quickly by force of gravity, closes the opening and trapping the mouse within the jar.

5 Claims, 5 Drawing Figures

U.S. Patent  Nov. 23, 1976  3,992,802
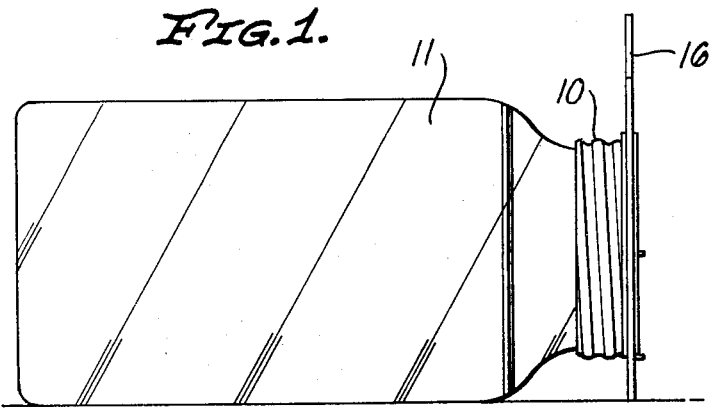
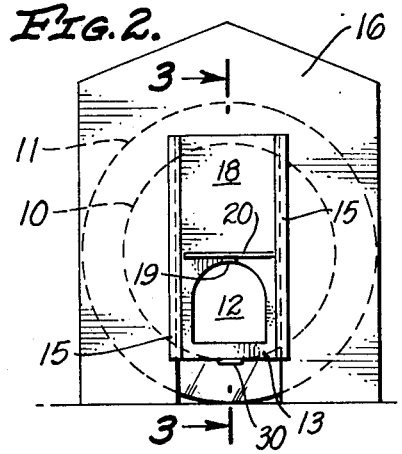
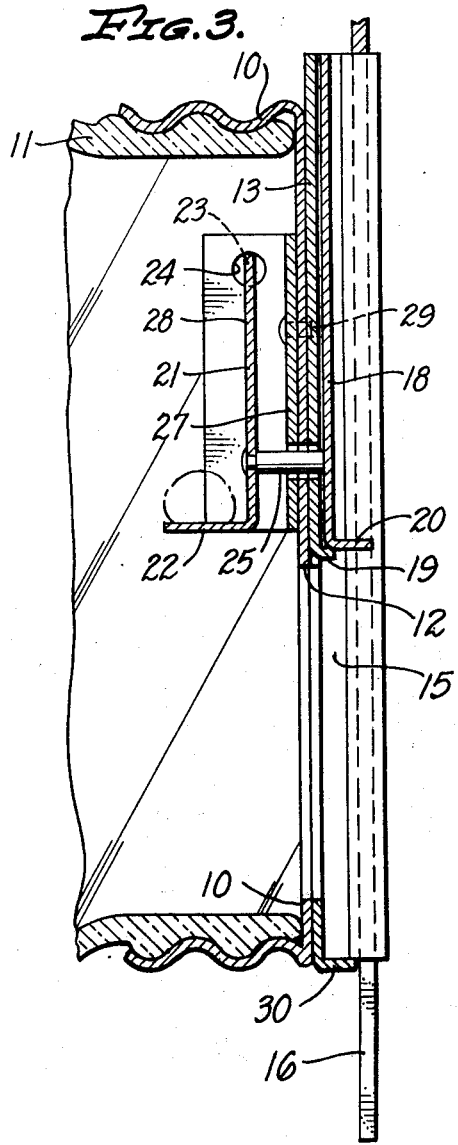
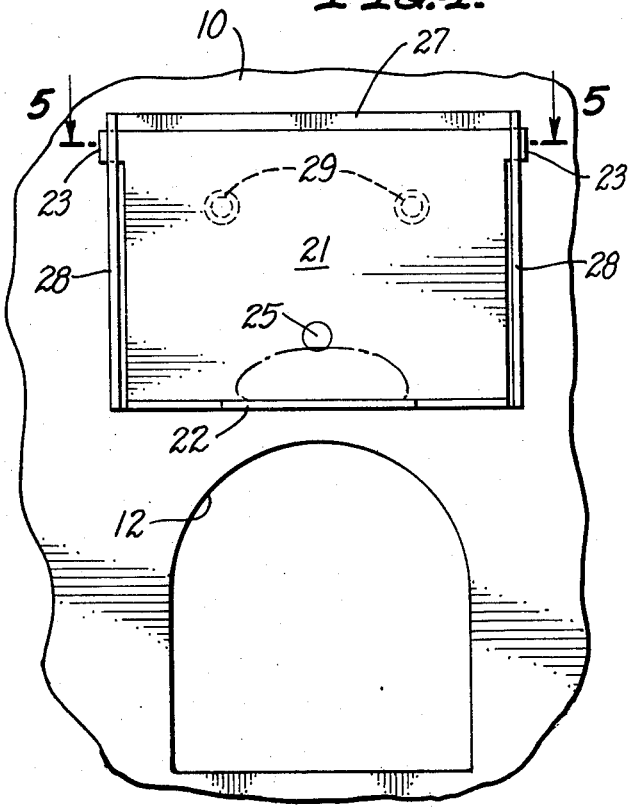
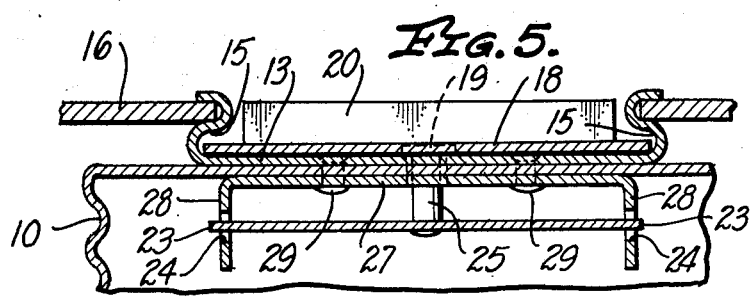

JAR LID MOUSE TRAP

BACKGROUND OF THE INVENTION

1. Field of the Invention

The invention relates to a mouse trap and particularly to a trap which is carried by a lid adapted to be removably connected to a conventional jar having a screw threaded neck.

2. Description of the Prior Art

There have been may types of mouse traps in the past, most of which have depended upon some form of spring impelled mechanism which engages and holds the body of the mouse.

Devices of the type described cause either killing or maiming of the animal, which is unpleasant to the user who must dispose of the dead or injured mouse. Such devices may also cause extended periods of pain for animals which are not instantly killed. If the animal is killed, odors will arise from deterioration of the body if it is not quickly removed.

Devices of that type can also cause injuries to the user by catching the fingers or hand within the trap while it is being baited or placed.

Traps of the type now in use are often difficult to operate and to place effectively. They may also be unsuccessful due to the ability of the mouse to remove some or all of the bait without being caught in the trap.

SUMMARY OF THE INVENTION

The present invention seeks to overcome all of the above deficiencies of the prior art by providing a jar lid type of mouse trap.

The device of the present invention can be baited and set without injury or risk of injury to the user. It can also be unset without injury or risk of injury to the user.

The present invention provides a trap in which the animal is not killed or injured in any way, but is merely captured.

By supplying a mouse trap in the form of a jar lid, the device is extremely economical, because it can be used with an empty conventional screw threaded jar which is readily available in every household without cost.

It is accordingly among the objects of the invention to provide all of the advantages and benefits described above and set forth hereinafter in this specification.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is a side elevational view of the mouse trap in use on a jar;

FIG. 2 is a front elevational view of the same, with the door in elevated position;

FIG. 3 is an enlarged sectional view of the same, taken on line 3—3 of FIG. 2;

FIG. 4 is an enlarged elevational view of the trap taken from the inside, with the door in open position; (jar omitted)

FIG. 5 is a sectional view taken on line 5—5 of FIG. 4.

DESCRIPTION OF THE PREFERRED EMBODIMENT

A preferred embodiment which has been selected to illustrate the invention comprises a screw threaded jar lid 10, which is adapted to be mounted on the neck of a conventional empty glass jar 11 of the type which is commonly available around every household.

An opening 12 is cut through the lid 10 and comprises a doorway through which a mouse can enter the jar. Mounted on the outside of the lid 10 (which would normally be the top surface) is a stationary plate 13. The opposite side edges of the stationary plate 13 are curved in an S-configuration to form a pair of tracks 15 and to also fit around the edges of a frame 16 which forms the front of the assembly.

Mounted on the inside of the lid 10 is a stationary support 27, the opposite side edges of which are directed inwardly at a right angle to form flanges 28, as best shown in FIG. 5 of the drawings. A pair of spaced rivets 29 extend through the mounting plate 13 and stationary support 27 to attach them securely to the lid 10.

A trap door 18 is mounted for vertical sliding movement along the tracks 15. The plate 13 is provided adjacent its midportion with an outwardly directed ledge 19 (FIG. 3) which is disposed directly above the top of the opening 12. The lower edge of the trap door 18 is bent outwardly to form a lip 20. As shown in FIG. 3, the corner edge of the lip 20 is adapted to rest on the ledge 19 in order to hold the trap door 18 in the elevated position shown in FIGS. 2–4. When the door 18 is in elevated position, its lower edge is disposed above the top of the opening 12 so that a mouse can pass through the opening 12 into the jar 11.

A bait holder 21 which also acts as a door trip comprises a plate having at its lower edge an integral inwardly directed bait holding platform 22. Suitable bait, which is indicated in phantom lines in FIGS. 3–4, may be placed on the platform 22 so that it is disposed within the neck of the jar 11.

The upper edge of the bait holder 21 is provided with a pair of outwardly directed ears 23 which extend into circular openings 24 formed in the upper portions of the flanges 28. The bait holder 21 is thereby mounted for swinging movement pivoting around the connections between the ears 23 and flanges 28.

A trip rivet 25 is secured to the lower portion of the bait holder 21 and extends forwardly therefrom. The rivet 25 extends through aligned openings in the stationary support 27, lid 10 and plate 13. The outer end of the trip rivet 25 is normally disposed directly adjacent to the back or inside of the trap door 18 when the door is in elevated position. This is best shown in FIG. 3 of the drawings.

In use, the trap is set in the manner shown in the drawings. Suitable bait is placed on the platform 22, which is so constructed and arranged that a mouse cannot reach the bait and either eat or pull it from the platform 22 without the mouse first entering the jar and turning its body around.

The trap door 18 is delicately balanced in elevated position by the inner edge of the lip 20 being mounted on and supported by the outer edge of the ledge 19.

When a mouse enters the jar 11 and starts to eat or remove the bait from the platform 22, such actions necessarily cause swinging movement of the bait holder 21. Such swinging movement causes the trip rivet 25 to move outwardly and push the trap door 18 slightly outwardly. Even a slight outward movement of the trap door 18 results in moving the lip 20 outwardly out of engagement with the ledge 19. The trap door 18 then moves quickly downwardly by the force of gravity, trapping the mouse within the jar 11.

It will be noted that the mouse is not hurt, nor is there any danger of injury to the person setting and baiting the trap. The device is simple to operate and economical to manufacture because a suitable empty jar can be furnished by the user without cost.

The frame 16 may be formed of cardboard, plastic or other suitable somewhat rigid material. It has a flat bottom edge which rests upon the ground or floor in order to prevent the jar from rolling movement. It may also carry suitable directions and/or instructions.

The bottom of the plate 13 is provided with a stop 30 which protrudes outwardly a greater distance than the ledge 19. The stop 30 limits the downward movement of the trap door 18.

The lid may also be used with other containers, such as cans, and other methods of attachment than screw threading may be used.

It will be noted that because of the weight and bulk of the jar or other container, it is impossible for the mouse to carry off the trap or for a cat to carry off both the mouse and trap, as can happen with conventional traps.

I claim:

1. A mouse trap incorporated with a lid which is adapted to be attached to a conventional screw threaded jar, said trap including a mouse size opening formed in said lid, a stationary plate mounted in overlying relationship to the outside of said lid, said plate having an opening aligned with said opening in said lid, said plate having a pair of opposite side edges forming a pair of vertically directed tracks, a trap door mounted for sliding vertical movement along said tracks between an elevated open position above said openings and a downward closed position overlying and closing said openings, a vertically directed bait holder mounted on the inside of said lid, said bait holder having at its lower end a horizontally directed platform adapted to hold bait thereon, the upper end of said bait holder being pivotally connected to the inside of said lid and the lower end of said bait holder being free, so that the lower end of said bait holder is adapted to be pivotally moved in a horizontal direction upon contact of a mouse with bait disposed on said platform, said stationary plate having an outwardly directed ledge normally supporting the lower edge of said trap door to hold said trap door in elevated open position, and a horizontally directed trip member attached at one end thereof to the lower part of said bait holder, said trip member extending through said lid and stationary plate to a point directly adjacent to the inner side of said trap door, so that pivotal movement of said bait holder moves the lower edge of said trap door horizontally outwardly beyond said ledge, whereby said trap door is released for downward movement by force of gravity to closed position upon pivotal movement of said bait holder resulting from contact of a mouse with bait disposed on said platform.

2. The structure described in claim 1, the lower edge of said trap door having an outwardly directed flange, said flange being adapted to rest upon said ledge when said trap door is disposed in open position, said flange providing means for manual movement of said trap door from closed position to open position.

3. The structure described in claim 1, and a stationary support mounted in overlying relationship to the inside of said lid, said stationary support having a pair of right angular flanges extending inwardly along its side edges, the side edges of the upper end of said bait holder being pivotally mounted on the upper portions of said flanges.

4. The structure described in claim 3, said lid having an inwardly directed internally screw threaded portion adapted to engage the threading of a jar, said stationary support and bait holder both being disposed within the area defined by the inner edge in said internally screw threaded portion.

5. The structure described in claim 1, said stationary plate having at its opposite side edges a pair of outwardly directed grooves, a frame mounted in said grooves, said frame having a flat bottom edge which is adapted to rest upon a supporting surface to prevent rolling movement of a jar to which said lid is attached.

* * * * *